United States Patent
Chen et al.

(10) Patent No.: US 7,447,827 B2
(45) Date of Patent: Nov. 4, 2008

(54) MULTI-PORT BRIDGE DEVICE

(75) Inventors: Jen-Chieh Chen, Taipei Hsien (TW); Kuan-Jui Ho, Taipei Hsien (TW)

(73) Assignee: VIA Technologies, Inc., Hsin Tien, Taipei Hsien (TW)

( * ) Notice: Subject to any disclaimer, the term of this patent is extended or adjusted under 35 U.S.C. 154(b) by 236 days.

(21) Appl. No.: 11/414,219

(22) Filed: May 1, 2006

(65) Prior Publication Data
US 2007/0016712 A1 Jan. 18, 2007

(30) Foreign Application Priority Data
Jul. 15, 2005 (TW) .................................. 94124033

(51) Int. Cl.
*G06F 13/00* (2006.01)
(52) U.S. Cl. ............................. 710/312; 710/306; 710/315
(58) Field of Classification Search ................. 710/306, 710/312, 315
See application file for complete search history.

(56) References Cited

U.S. PATENT DOCUMENTS

| | | | | |
|---|---|---|---|---|
| 6,167,476 A | * | 12/2000 | Olarig et al. ................. | 710/315 |
| 6,363,439 B1 | * | 3/2002 | Battles et al. ................ | 710/36 |
| 6,523,082 B1 | * | 2/2003 | Yoshida ....................... | 710/313 |
| 6,898,740 B2 | * | 5/2005 | Olarig ......................... | 714/43 |
| 2002/0109688 A1 | * | 8/2002 | Olarig ......................... | 345/520 |
| 2005/0193172 A1 | * | 9/2005 | Mukker et al. ............... | 711/118 |

OTHER PUBLICATIONS

Accelerated Graphics Port Interface Specification, Revision 2.0; Intel Corporation; May 4, 1998; pp. 1-10 and 243-255.*

* cited by examiner

*Primary Examiner*—Glenn A Auve
(74) *Attorney, Agent, or Firm*—Birch, Stewart, Kolasch & Birch, LLP

(57) ABSTRACT

A bridge device electrically connected to a first AGP bus, a second AGP bus, and a PCI bus is provided. The bridge device has a first bridge, a second bridge, and a controller. The first bridge is electrically connected between the first AGP bus and the second AGP bus. The second bridge is electrically connected between the first AGP bus and the PCI bus. The controller is electrically connected to the first AGP bus, the first bridge, and the second bridge. As a configuration cycle corresponding to the first bridge being transmitted through the first AGP bus to the controller, the controller responds a preset message implying that the first bridge does not exist.

13 Claims, 5 Drawing Sheets

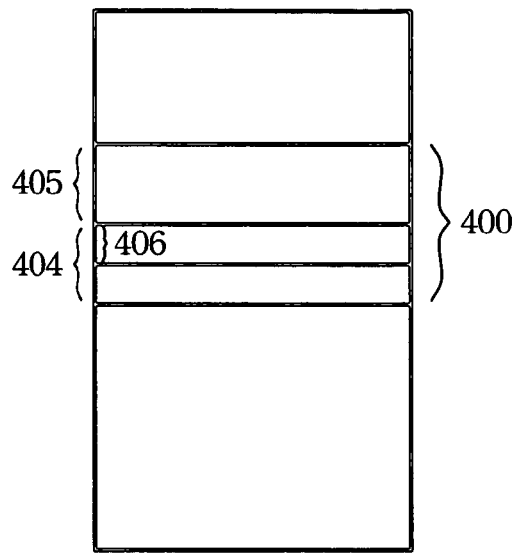 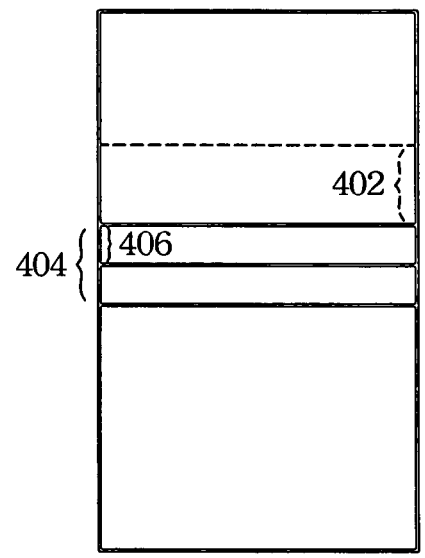
FIG.5a    FIG.5b
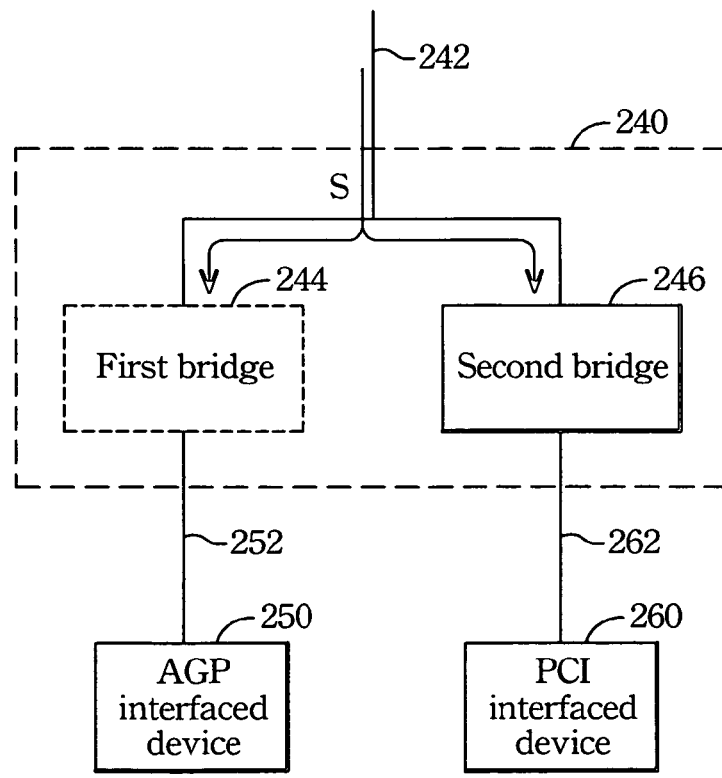
FIG.6

MULTI-PORT BRIDGE DEVICE

BACKGROUND OF THE INVENTION (1) Field of the Invention

The disclosure relates to a multi-port bridge device in a computer system, and more particularly relates to the bridge device having at least one accelerated graphic port (AGP) and a peripheral component interconnect (PCI) port and a computer system therefor.

(2) Description of the Prior Art

FIG. 1 is a block diagram of a typical computer system supporting both accelerated graphic port (AGP) and peripheral component interconnect (PCI) interface. The computer system 100 has a central processing unit (CPU) 110, a core logic 120, a random access memory (RAM) 130, an AGP bus 152, a PCI bus 142, a PCI/PCI bridge 140, an AGP interface device 150, and at least one PCI interface device 160, and for example, three PCI interface devices 160 are shown in FIG. 1.

The CPU 110 is electrically connected to the core logic 120 through a host bus 112. The RAM 130 is electrically connected to the core logic 120 through a memory bus 132. The AGP interface device 150 is electrically connected to the core logic 120 through the AGP bus 152. The PCI/PCI bridge 140 is electrically connected to the core logic 120 through the PCI bus 142. The PCI interface devices 160 are electrically connected to the PCI/PCI bridge 140 and further electrically connected to the core logic 120 through the PCI bus 142.

FIG. 2 is a functional block diagram of the core logic 120 in FIG. 1. As shown, the core logic 120 has a host bus interface 122, a memory bus interface 124, and a host/PCI bridge 126. The host bus interface 122 is electrically connected to the host bus 112 for accessing data, address, and control signals from the CPU 110. In addition, the host bus interface 122 is also electrically connected to the memory bus interface 124 and the host/PCI bridge 126. The memory bus interface 124 is electrically connected to the memory bus 132 and generates control signals and timing signals for deciding reading and writing procedures within the memory 130. The host/PCI bridge 126 is electrically connected to the PCI bus 142 and the AGP bus 152.

Ordinarily, AGP interface was developed on the basis of PCI interface but focusing on upgrading the bandwidth between the graphic accelerator and the memory to meet the demand of huge data transmission due to 3-dimensional images. Table. 1 lists the differences between AGP interface and PCI interface. As shown, not only the type of connectors but also the data transmission philosophy of the two interfaces are different.

| Interface | AGP | PCI |
| --- | --- | --- |
| Operation speed | 32 Bits | 32 Bits |
| Operation frequency | 66 MHz | 33/66 MHz (usually 33 MHz) |
| No. of contacts | 132 double layer (4X) 124 double layer (8X) | 120 single layer |
| Execution | Pipelined Requests | Non-pipelined |
| Address/Data transmission | Address/Data de-multiplexed | Address/Data multiplexed |
| Transmission speed | 1066 MB/s (4X) 2133 MB/s (8X) | 133 MB/s (33 MHz) |

Since the transmission speed available by using AGP interface is much greater than that by using PCI interface, the AGP bus 152 of FIG. 1 supports a bandwidth much greater than the PCI bus 142 does. Furthermore, since the three PCI interface devices 160 electrically connected to the PCI/PCI bridge 140 are electrically connected to the 15 core logic 120 through the PCI bus 142 in present, the bandwidth of the PCI bus 142 has to be shared by the three PCI interface devices 160 simultaneously.

As mentioned, the operation speed and efficiency of the PCI interface devices 160 are very much restricted by the bandwidth of the PCI bus 142. Therefore, for the improvement of the operation of the whole computer system, it has become an important issue to break through the limitation of the bandwidth of the PCI bus.

SUMMARY OF THE INVENTION

The present invention provides a bridge device in a computer system to have the PCI interface devices sharing the bandwidth of the AGP bus to improve the operation of the computer system and prevent the problem of system conflict.

The bridge device provided in the present invention is electrically connected to a first AGP bus, a second AGP bus, and a PCI bus. The bridge device has a first bridge, a second bridge, and a controller. The first bridge is electrically connected between the first AGP bus and the second AGP bus. The second bridge is electrically connected between the first AGP bus and the PCI bus. The controller is electrically connected to the first AGP bus, the first bridge, and the second bridge. As a configuration cycle corresponding to the first bridge is transmitted through the first AGP bus to the controller, the controller responds a preset message implying that the first bridge does not exist.

According to the bridge device mentioned above, a computer system supporting both PCI interface and AGP interface is also provided in the present invention. The computer system has a CPU, a core logic, a first AGP bus, the provided bridge device, an AGP interface device, and at least one PCI interface device. The core logcic is electrically connected to the CPU. The first AGP bus is electrically connected to the core logic. The bridge device is electrically connected to the core logic through the first AGP bus and also electrically connected with the second AGP bus and the PCI bus. The AGP interface device is electrically connected to the bridge device through the second AGP bus. The PCI interface device is electrically connected to the bridge device through the PCI bus. As a configuration cycle corresponding to the first bridge within the bridge device is transmitted through the first AGP bus to the bridge device, the controller within the bridge device may selectively respond a preset message implying that the first bridge does not exist. Then, another configuration cycle corresponding to the AGP interface device may detect that the AGP interface device is electrically connected to the first AGP bus directly.

A method for connecting a PCI interface device to an AGP bus by using the mentioned bridge device is also provided in the present invention. Firstly, a configuration cycle corresponding to the first bridge is generated. As the controller accessing the configuration cycle, the controller within the bridge device responds a preset message implying that the first bridge does not exist. Then, allocating address space to the bridge device, the second bridge, the PCI interface device, and the AGP interface device, respectively. Afterward, setting the address space reserved to the first bridge as the address space reserved to the bridge device without being reserved to the second bridge.

BRIEF DESCRIPTION OF THE DRAWINGS

The present invention will now be specified with reference to its preferred embodiment illustrated in the drawings, in which:

FIGS. 5a and 5b are schematic views depicting the allocation of address space for the peripheral devices of the computer system in accordance with the present invention;

FIG. 6 is a block diagram depicting the operation of the bridge device in FIG. 3;

DESCRIPTION OF THE PREFERRED EMBODIMENTS

Figure 1:
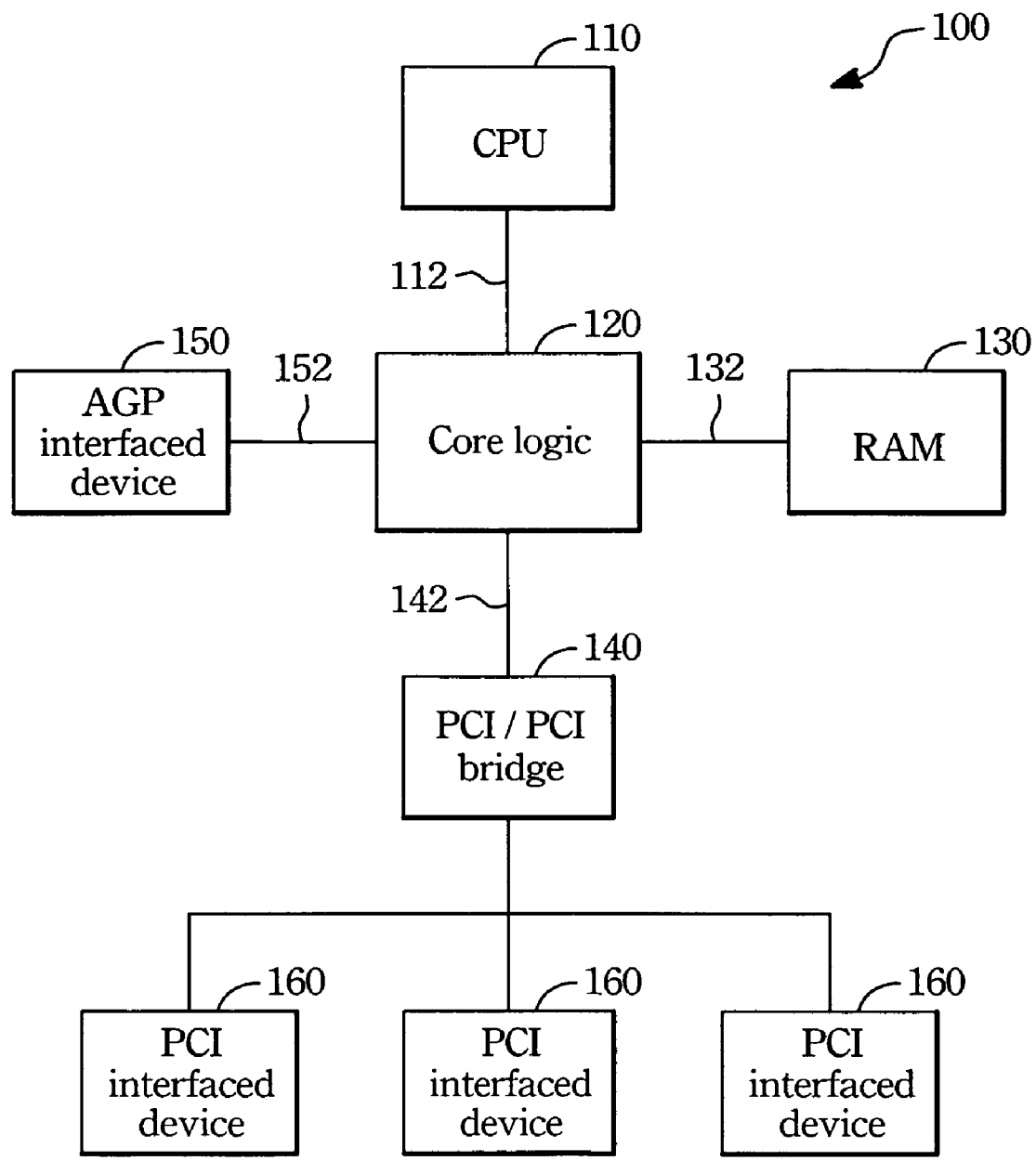
FIG. 1 is a functional block diagram depicting a typical computer system.
Figure 2:
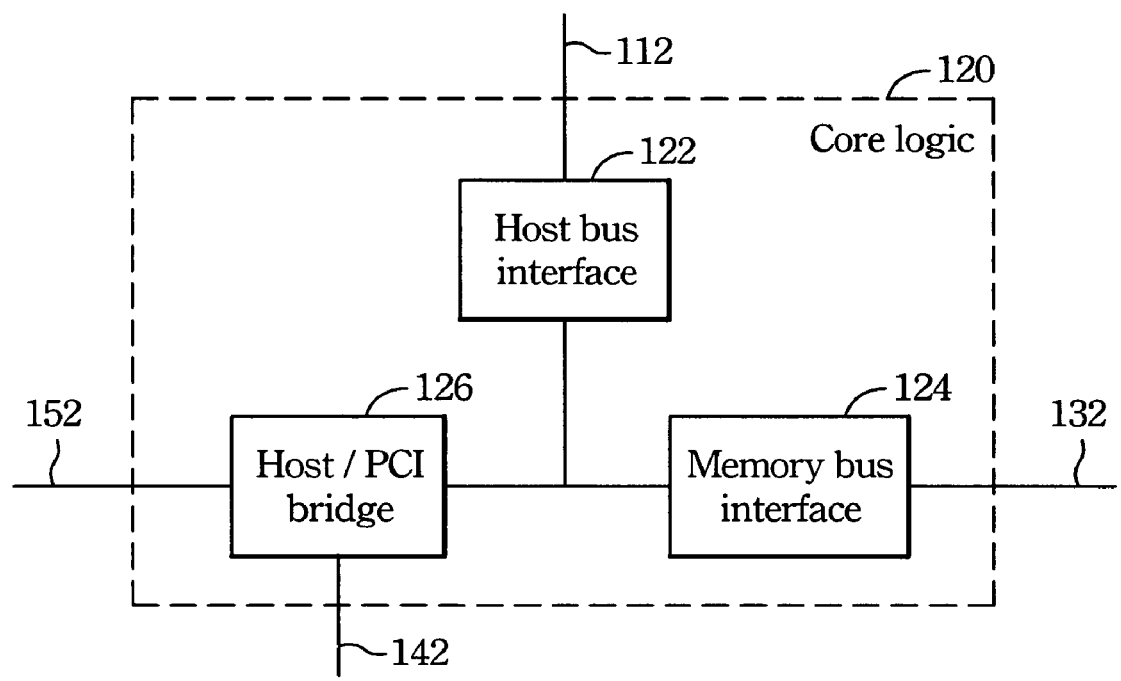
FIG. 2 is a functional block diagram depicting the core logic of FIG. 1.
Figure 3:
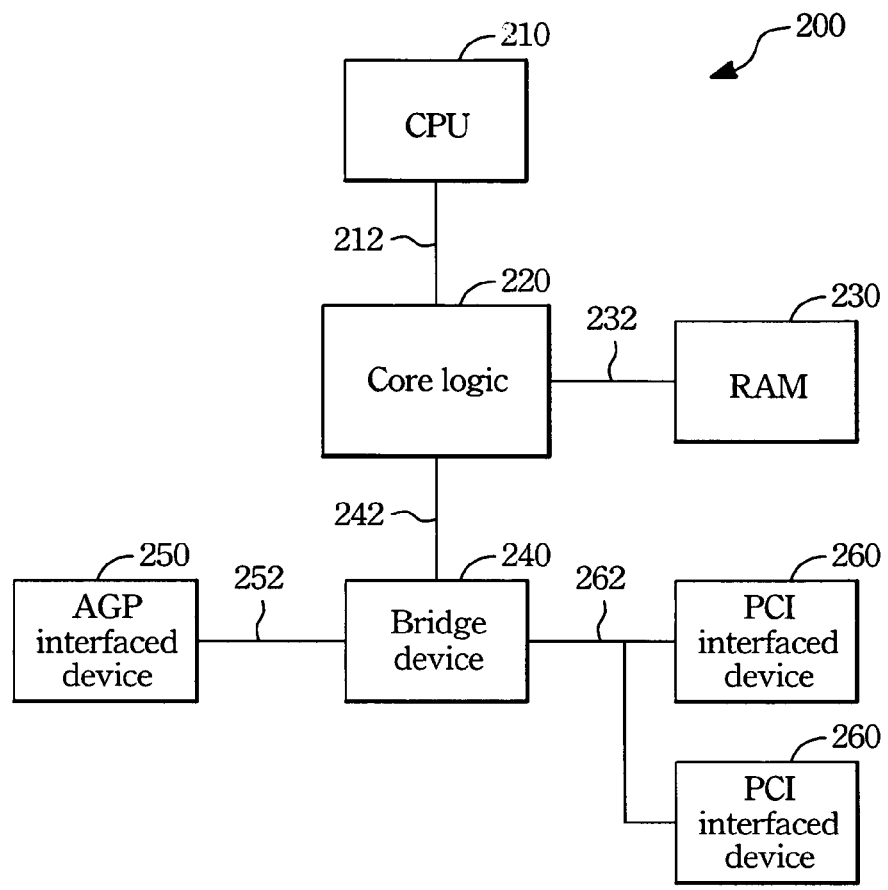
FIG. 3 is a block diagram depicting a preferred embodiment of a computer system in accordance with the present invention.

FIG. 3 is a block diagram depicting a preferred embodiment of the computer system 200 supporting both PCI interface and AGP interface in accordance with the present invention. The computer system 200 has a CPU 210, a core logic 220, a RAM 230, a first AGP bus 242, a bridge device 240, an AGP interface device 250, and at least one PCI interface device 260, and for example, two PCI interface devices 260 are shown in FIG. 3. The core logic 220 is electrically connected to the CPU 210. The first AGP bus 242 is electrically connected to the core logic 220. The bridge device 240 is electrically connected to the core logic 220 through the first AGP bus 242. In additional, the bridge device 240 is also electrically connected to a second AGP bus 252 and a PCI bus 262. The AGP interface device 250 is electrically connected to the bridge device 240 through the second AGP bus 252. The PCI interface device 260 is electrically connected to the bridge device 240 through the PCI bus 262.

Figure 4:
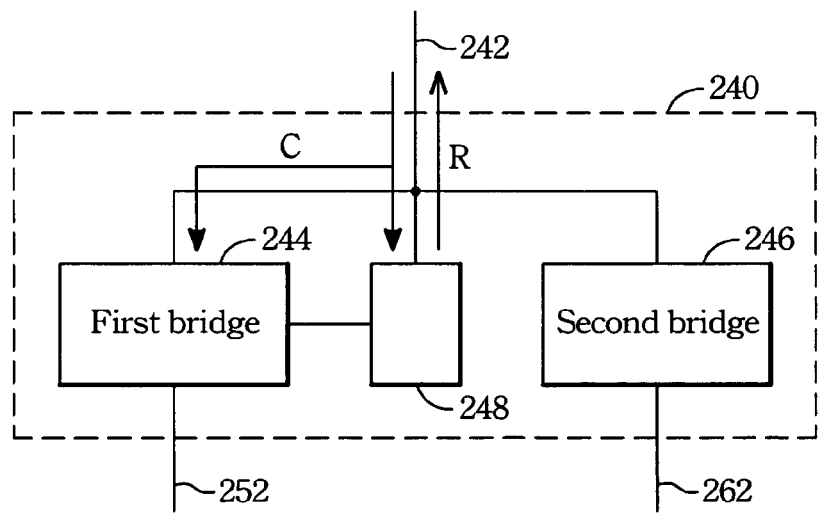
FIG. 4 is a block diagram depicting a preferred embodiment of the bridge device in FIG. 3.

FIG. 4 is a functional block diagram depicting a preferred embodiment of the bridge device 240 in FIG. 3. As shown, the bridge device 240 has a first bridge 244, a second bridge 246, and a controller 248. The first bridge 244 is electrically connected between the first AGP bus 242 and the second AGP bus 252. The second bridge 246 is electrically connected between the first AGP bus 242 and the PCI bus 262. The controller 248 is electrically connected to the first AGP bus 242, the first bridge 244, and the second bridge 246.

It is noted that the first bridge 244 and the second bridge 246 may judge whether the signal transmission target is matched and selectively permit the communication with the peripheral devices, such as the AGP interface device 250, the PCI interface device 260, and etc. For example, assuming a signal transmitted from the PCI interface device 260 to the core logic 220 is provided. As the signal arriving the bridge device 240, the first bridge 244 within the bridge device 240 doesn't permit the signal transmitted to the AGP interface device 250 and has the signal transmitted through the first AGP bus 242 to the core logic 220. Without the help of the first bridge 244, the signal may be wrongly transmitted to the AGP interface device 250, and in such circumstance, the AGP interface device 250 needs an additional function for recognizing the target of the signal to prevent accessing unwanted signals.

Referring to FIG. 4, as a configuration cycle C corresponding to the first bridge 244 is transmitted through the first AGP bus 242 to the controller 248, the controller 248 may selectively responds a preset signal R implying that the first bridge 244 does not exist. That is, in views of the computer system, the first bridge 244 doesn't exist and the AGP interface device 250 is detected as being electrically connected to the first AGP bus 242 directly. Therefore, a configuration cycle corresponding to the AGP interface device 250 may detects the AGP interface device 250 as being electrically connected to the first AGP bus 242 directly.

As a computer system doing configuration transaction, each peripheral device is given a respected value including a bus number and a device number representing the location of the device. Since the AGP interface device 250 is detected as being directly electrically connected to the first AGP bus 242, the AGP interface device 250 and the bridge device 240 may be recognized as being electrically connected to the same bus (number 1). In addition, the AGP interface device 250 is usually given a device number 0. Thus, the AGP interface device 250 is given the value (bus1, dev0), which matches the setting of typical AGP interface drivers and is benefit for the operation of the AGP interface device 250.

Then, the firmware with PCI function, such as typical BIOS program, is executed to setup configuration for each peripheral device of the computer system. Basically, the firmware must allocate three address spaces to each peripheral device. The three address spaces including memory location address space, IO address space, and configuration register address space. Therefore, the bridge device 240, the AGP interface device 250, and the PCI interface device 260 in FIG. 3, the first bridge 244 and the second bridge 246 in FIG. 4, must be reserved with specific address to prevent system conflict from happening.

Take the memory address space for example. As the controller 248 responding the preset signal R implying that the first bridge 244 doesn't exist, the AGP interface device 250 is detected as electrically connected to the first AGP bus 242 directly. FIG. 5a shows the allocation of the memory address space for the peripheral devices. The address preserved to the bridge device 240 is labeled 400. The address preserved to the AGP interface device 250 and the second bridge 246 are labeled 405 and 404 respectively. The address domains 405 and 404 are situated inside the address domain 400 and the sum of the address domains 405 and 404 equals the address domain 400. However, there is no specific domain preserved to the first bridge 244. In addition, since the PCI interface device 260 is electrically connected to the second bridge 246, the address domain 406 corresponding to the PCI interface device 260 is situated inside the address domain 404.

Under such circumstance, as shown in FIG. 6, the controller 248 is not shown in this figure, as a control signal S corresponding to the AGP interface device 250 which respected to the address located within the address domain 405 is transmitted through the first AGP bus 242 to the bridge device 240, the system checks the address space domains with respect to the first bridge 244 and the second bridge 246 to decide which one is related. Since the address domain corresponding to the first bridge 244 is not defined and is showed in FIG. 5b, the address space with respect to the control signal S, which is not situated in the address domain 404 of the second bridge 246, may suggest that the control signal S should not be transmitted toward the first bridge 244 and so not be transmitted to the AGP interface device 250. The transmission of the control signal is badly influenced.

Figure 7:
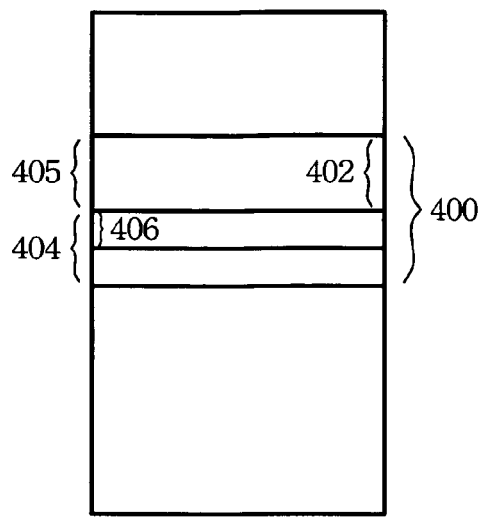
FIG. 7 is a schematic view depicting a preferred embodiment of reserving address space to the first bridge in accordance with the present invention.

FIG. 7 shows a preferred embodiment of a method for solving the above mentioned problem by setting the address domain preserved to the first bridge 244 in accordance with the present invention. Since the address domain 400 preserved to the bridge device 240 should cover the address domains preserved to the first bridge 244 and the second bridge 246, and the sum of the two address domains is identical to the address domain 400, the address domain 402 preserved to the first bridge 244 may be set as the portion of the address domain 400 preserved to the bridge device 240 without the address domain 404 preserved to the second bridge 246. Thereby, the problem due to the lack of respected address domain of the first bridge 244 may be solved.

Figure 8:
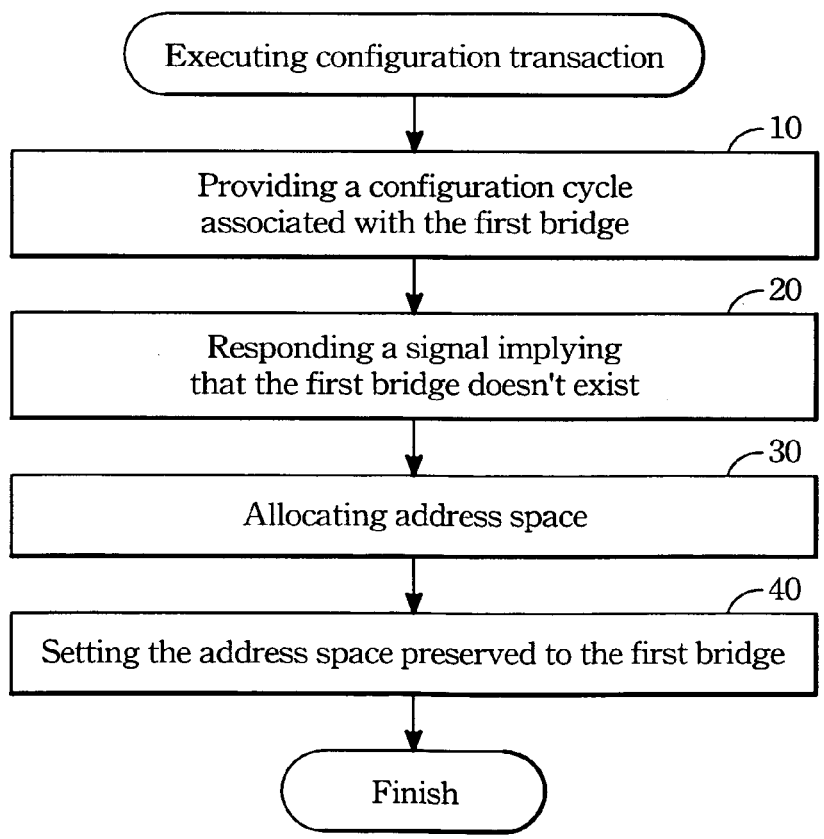
FIG. 8 is a flow-chart depicting a preferred embodiment of connecting the PCI interface device to the AGP bus in accordance with the present invention.

FIG. 8 is a flow-chart depicting a method for connecting a PCI interface device to an AGP bus by using the mentioned bridge device 240 in the present invention. Firstly, as shown in step 10, the configuration cycle corresponding to the first bridge 244 is generated. As the configuration cycle is accessed, as shown in step 20, the bridge device 240 responds a preset message implying that the first bridge 244 does not exist. Then, as shown in step 30, the firmware of the computer system allocates the address space resource, as the address domains described in FIG. 7, to the bridge device 240, the second bridge 246, the PCI interface device 260, and the AGP interface device 250, respectively. It is noted that the address space preserved to the second bridge 246 occupies a certain portion of the address space preserved to the bridge device 240. Afterward, as shown in step 40 and also referring to FIG. 7, the address space preserved to the first bridge 244 is set as the portion of the address space preserved to the bridge device 240 without being preserved to the second bridge 246.

The bridge device, computer system, and the operation method thereof enhance the operation speed of the PCI interface device 260 by sharing the bandwidth of the AGP bus 242 and also prevent the problem of system conflict. In addition, the AGP interface device 250 in the computer system of the present invention is given a value (bus1, dev0), which matches the setting of typical AGP interfaced drivers to prevent to problem about software setting and operation of the AGP interface device.

While the embodiments of the present invention have been set forth for the purpose of disclosure, modifications of the disclosed embodiments of the present invention as well as other embodiments thereof may occur to those skilled in the art. Accordingly, the appended claims are intended to cover all embodiments which do not depart from the spirit and scope of the present invention.

We claim:

1. A bridge device comprising:
   a controller, electrically connected to a first AGP bus; and
   a first bridge, electrically connected to the controller and an AGP interface device;
   wherein as a configuration cycle corresponding to the first bridge is transmitted through the first AGP bus to the controller, the controller responds by providing a message indicating that the first bridge does not exist.

2. The bridge device of claim 1 wherein the AGP interface device is electrically connected to the first bridge through a second AGP bus.

3. The bridge device of claim 2, wherein a configuration cycle corresponding to the AGP interface device detects that the AGP interface device being electrically connected to the first AGP bus directly when the controller responds by providing the message indicating that the first bridge does not exist.

4. The bridge device of claim 1, wherein the controller sets a proportion of resource in an address space preserved to the first bridge to resource in the address space preserved to the bridge device.

5. The bridge device of claim 4, wherein the address space is memory space, I/O address space, or configuration register address space.

6. A computer system with a bridge device, supporting both PCI interface device and AGP interface device, the computer system comprising:
   a core logic;
   the bridge device electrically connected to the core logic through a first AGP bus, comprising:
      a controller, electrically connected to the first AGP bus; and
      a first bridge, electrically connected to the controller;
      a second bridge, electrically connected to the controller;
      wherein as a configuration cycle corresponding to the first bridge is transmitted through the first AGP bus to the controller, the controller responds by providing a message indicating that the first bridge does not exist;
   an AGP interface device, electrically connected to the first bridge through a second AGP bus; and
   at least one PCI interface device, electrically connected to the second bridge through a PCI bus.

7. The computer system of claim 6, wherein after the controller responds by providing the message indicating that the first bridge does not exist, another configuration cycle corresponding to the AGP interface device is responded as that the AGP interface device being electrically connected to the first AGP bus directly.

8. The computer system of claim 6, wherein the controller sets resource in an address space preserved to the first bridge equal to resource in the address space preserved to the bridge device deducting resource in the address space preserved to the second bridge.

9. The computer system of claim 8, wherein the address space is memory space, I/O address space, or configuration register address space.

10. A operating method of a bridge device comprising the steps of:
    providing a multi-port bridge device having a controller and a first bridge electrically connected to the controller;
    providing an AGP interface device electrically connected to the first bridge;
    generating a configuration cycle corresponding to the first bridge;
    wherein as the configuration cycle being accessed by the controller, the multi-port bridge device responds by providing a message indicating that the first bridge does not exist;
    providing an address space; and
    allocating the address space to provide a part of the address space to the multi-port bridge device, and a part of the address space of the multi-port bridge device is preserved to the first bridge.

11. The method of claim 10 further comprising:
    providing a second bridge of the multi-port bridge device; and
    providing at least one PCI interface device electrically connected to the second bridge.

12. The method of claim 11, the step of allocating the address space further comprising:
    allocating the address space to the bridge device, the AGP interface device, the PCI interface device, and the second bridge, and resource in the address space preserved to the second bridge is included in that preserved to the bridge device; and
    setting resource in the address space preserved to the first bridge equal to resource in the address space preserved to the bridge device deducting resource in the address space preserved to the second bridge.

13. The method of claim 10, wherein the address space is memory space, I/O address space, or configuration register address space.

* * * * *